United States Patent

[11] 3,626,310

[72] Inventor Junior I. Rhodes
Lynchburg, Va.
[21] Appl. No. 17,249
[22] Filed Mar. 6, 1970
[45] Patented Dec. 7, 1971
[73] Assignee General Electric Company

[54] FREQUENCY DISCRIMINATOR
12 Claims, 1 Drawing Fig.

[52] U.S. Cl. 329/117, 307/233, 307/321, 329/141, 329/166, 329/198
[51] Int. Cl. H03d 3/16
[50] Field of Search 329/117, 119, 198, 166; 307/233, 321; 325/349

[56] References Cited

UNITED STATES PATENTS

| | | | |
|---|---|---|---|
| 3,512,095 | 5/1970 | Linder | 329/117 |
| 3,199,040 | 8/1965 | Coogan | 329/117 |
| 3,202,921 | 8/1965 | Wissel | 307/233 X |

*Primary Examiner*—Alfred L. Brody
*Attorneys*—James J. Williams, Frank L. Neuhauser, Oscar B. Waddell and Joseph B. Forman

ABSTRACT: Frequency discrimination is provided by two piezoelectric crystals tuned above and below a center frequency, and by rectifiers connected to the crystals.

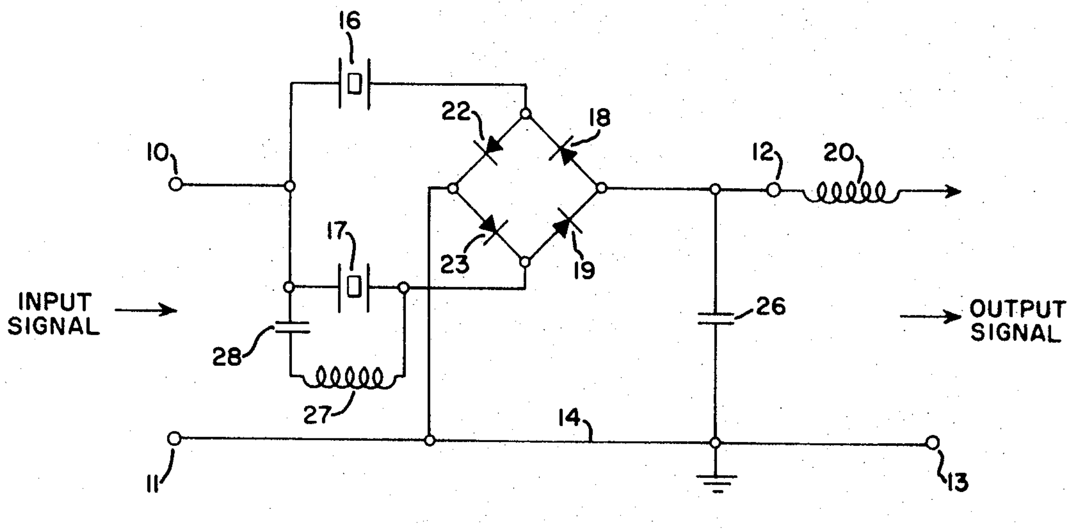
INVENTOR:
JUNIOR I. RHODES,
BY James J. Williams
HIS ATTORNEY.

FREQUENCY DISCRIMINATOR

BACKGROUND OF THE INVENTION

My invention relates to a frequency discriminator, and particularly to a frequency discriminator that has improved performance and that is relatively small and simple.

In the field of electronics and radio, present trends and demands are toward equipment that is relatively small and light in order to conserve space and weight. At the same time, performance requirements, such as the frequency stability of a radio receiver, are becoming more strict or rigid. In the case of frequency modulation receivers, these trends and requirements make the design and production of such receivers relatively difficult. In some instances, a compromise is made with the result that one requirement is not fulfilled in order that another requirement can be fulfilled.

Accordingly, an object of my invention is to provide a new and improved frequency discriminator that is relatively small and light and that also has relatively good performance characteristics.

Another object of my invention is to provide a new and improved frequency discriminator that lends itself to microelectronic manufacturing techniques.

In electronic and radio equipment, inductances are one of the more difficult components to manufacture, and they generally require a relatively large amount of space. Accordingly, another object of my invention is to provide a new and improved frequency discriminator that requires no inductances, or at most one inductance if a large bandwidth is required.

And finally, another object of my invention is to provide a new and improved frequency discriminator that utilizes piezoelectric crystals so as to take advantage of their relatively small size, their precision, and their stability.

SUMMARY OF THE INVENTION

Briefly, these and other objects are achieved in accordance with my invention by a frequency discriminator having first and second piezoelectric crystals tuned above and below a selected carrier frequency. Input signals are applied to both crystals. Rectifiers are coupled in opposite polarity relation to the crystals so as to produce audio signals. A neutralizing inductance may be coupled in parallel with the low frequency crystal if the discriminator must provide a relatively large bandwidth.

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the accompanying drawing, in which the single figure shows a circuit diagram of a preferred embodiment of a frequency discriminator in accordance with my invention.

DESCRIPTION OF THE PREFERRED EMBODIMENT

With respect to the figure, input signals are applied to my discriminator at first and second input terminals 10, 11. Typically, these input signals are frequency modulated (sometimes called angle-modulated) and centered at a selected radio frequency carrier, such as would be provided by the intermediate frequency or radio frequency stage of a frequency modulation (FM) receiver. The input terminal 11 is directly connected to an audio output terminal 13 over a common bus 14 which may be grounded as shown. The input terminal 10 is connected (directly i.e., without impedance) to two piezoelectric crystals 16, 17. The crystal 16 is tuned to a frequency spaced above the signal center frequency, and the crystal 17 is tuned to a frequency spaced below the center frequency. These spacings are preferably the same, and determine the maximum frequency deviation accepted by the discriminator.

The crystal 16 is coupled to the cathode of a diode rectifier 18, and similarly the crystal 17 is coupled to the anode of a diode rectifier 19. The anode of the rectifier 18 and the cathode of the rectifier 19 are connected together and to the other output terminal 12. A direct current path must be provided from the cathode of the rectifier 18 to the bus 14, and from the anode of the rectifier 19 to the bus 14. In order to utilize small components, I prefer to provide this direct current path by two diode rectifiers 22, 23. As shown, the rectifier 22 is connected in the same polarity direction as the rectifier 18, and the rectifier 23 is connected in the same polarity direction as the rectifier 19. A bypass capacitor 26 is connected between the output terminal 12 and the bus 14 to improve rectifier efficiency at the radio frequency under certain conditions. If needed, a radio frequency impedance 20 may be provided between the output terminal 12 and the utilization circuit. If a relatively wide bandwidth is to be provided by the discriminator, a neutralizing inductance 27 is connected in parallel with the lower frequency crystal 17. This inductance 27 has a magnitude such that it resonates with the inherent capacity of the crystal 17 at its antiresonant (or parallel resonant) frequency. A direct current blocking capacitor 28 may be connected in series with the inductance 27 if direct current isolation is needed.

Two embodiments of my frequency discriminator were constructed in accordance with the circuit shown in the drawing. Both embodiments were constructed for an input signal centered at a frequency of 20 MHz. The first embodiment was a wide-band discriminator, and its crystals 16, 17 were built on a single plate, were uncoupled, and were respectively resonant at 20,020 and 19,980 kHz. The capacitor 26 had a value of 82 $\mu\mu$f., the inductor 27 had a value of 50 $\mu$h., and the capacitor 28 had a value of 100 $\mu\mu$f. A 20 MHz. input signal having a magnitude of 0.6 v. r.m.s. was supplied by a 150 $\Omega$ source and was modulated with a frequency of 400 Hz. An output audio signal of approximately 130 mv. was produced across a 10,000 $\Omega$ load. This output signal had only 2.1 percent distortion with an input deviation of $\pm$15 kHz. The second embodiment was a more narrow band discriminator, and its crystals 16, 17 were also built on a single plate, were uncoupled, and were respectively resonant at 20,010 and 19,990 kHz. The other components were kept the same as the first embodiment. A 20 MHz. input signal having a magnitude of 0.6 v. r.m.s. was supplied by a 150 $\Omega$ source and was modulated with a frequency of 400 Hz. An output audio signal of approximately 132 mv. was produced across a 7,500 $\Omega$ load. This output signal had only 1.2 percent distortion with an input deviation of $\pm$5 kHz.

It will thus be seen that my invention provides a new and improved frequency discriminator. My discriminator utilizes piezoelectric crystals which are relatively stable and accurate, and at the same time are relatively small and light. In addition, my discriminator utilizes diodes and capacitors which are also relatively small. My discriminator requires no inductances in narrow band applications, and only one inductance in wide band applications. In some situations, a radio frequency choke may be desirable at the output. Thus, my discriminator lends itself particularly well to microelectronic construction. In operation, my discriminator provides a relatively linear (or low distortion) output, and can operate on a relatively low level input signal. Persons skilled in the art will appreciate that modifications can be made to may invention. For example, the crystals 16, 17 may be separate structures, or monolithic structures, or some other form. The diode rectifiers 18, 19, 22, 23 may take various forms, depending upon design conditions and preferences. And, the diode rectifiers 22, 23 may be replaced by a direct current path such as resistors. Variations in the source and load impedances vary the circuit Qs, and hence the circuit linearity. Therefore, while may invention has been described with reference to only one embodiment, it is to be understood that modifications may be made without departing from the spirit of my invention or from the scope of the claims.

What I claim as new and desire to secure by Letters Patent of the United States is:

1. An improved discriminator comprising:
a. first and second input terminals for receiving angle-modulated signals having a selected carrier frequency;
b. first and second output terminals for providing output signals;
c. a first piezoelectric device having first and second terminals and a resonant frequency higher than said carrier frequency;
d. means connecting said first terminal of said first piezoelectric device directly to said first input terminal;
e. a second piezoelectric device having first and second terminals and a resonant frequency lower than said carrier frequency;
f. means connecting said first terminal of said second piezoelectric device directly to said first input terminal;
g. first and second rectifiers serially connected in the same first polarity direction between said first and second output terminals;
h. means connecting said second terminal of said first piezoelectric device to the junction of said first and second rectifiers;
i. third and fourth rectifiers serially connected in the same second polarity direction between said first and second output terminals, said second polarity direction being opposite to said first polarity direction;
j. means connecting said second terminal of said second piezoelectric device to the junction of said third and fourth rectifiers;
k. and means connecting said second input terminal to said second output terminal.

2. The improved discriminator of claim 1 and further comprising a neutralizing inductance connected in shunt with said second piezoelectric device.

3. The improved discriminator of claim 1 and further comprising a capacitor connected between said first and second output terminals.

4. The improved discriminator of claim 3 and further comprising a neutralizing inductance connected in shunt with said second piezoelectric device.

5. The improved discriminator of claim 1 wherein said first piezoelectric device is resonant at a frequency higher than said carrier frequency by a selected spacing and said second piezoelectric device is resonant at a frequency lower than said carrier frequency by said selected spacing.

6. The improved discriminator of claim 5 and further comprising a neutralizing inductance connected in shunt with said second piezoelectric device.

7. The improved discriminator of claim 5 and further comprising a capacitor connected between said first and second output terminals.

8. The improved discriminator of claim 5 and further comprising a neutralizing inductance connected in shunt with said second piezoelectric device, and a capacitor connected between said first and second output terminals.

9. An improved discriminator comprising:
a. first and second input terminals for receiving modulated signals having a selected carrier frequency;
b. first and second output terminals for providing demodulated output signals;
c. a first piezoelectric crystal having one terminal directly connected to said first input terminal, said first crystal being resonant at a frequency higher than said carrier frequency by a selected amount;
d. a first rectifier having its cathode connected to the other terminal of said first crystal and its anode connected to said first output terminal;
e. a second rectifier having its anode connected to said other terminal of said first crystal and its cathode connected to said second output terminal;
f. a second piezoelectric crystal having one terminal directly connected to said first input terminal, said second crystal being resonant at a frequency lower than said center frequency by said selected amount;
g. a third rectifier having its anode connected to the other terminal of said second crystal and its cathode connected to said first output terminal;
h. a fourth rectifier having its cathode connected to said other terminal of said second crystal and its anode connected to said second output terminal;
i. and means connecting said second input terminal to said second output terminal.

10. The improved discriminator of claim 9 and further comprising a neutralizing inductance connected in shunt with said second crystal.

11. The improved discriminator of claim 9 and further comprising a capacitor connected between said first and second output terminals.

12. The improved discriminator of claim 11 and further comprising a neutralizing inductance connected in shunt with said second crystal.

* * * * *